(12) United States Patent
Chang et al.

(10) Patent No.: US 8,960,955 B2
(45) Date of Patent: Feb. 24, 2015

(54) LED LAMP HAVING A LARGE ILLUMINATION ANGLE

(71) Applicant: Advanced Optoelectronic Technology, Inc., Hsinchu Hsien (TW)

(72) Inventors: Chao-Hsiung Chang, Hsinchu (TW); Lung-Hsin Chen, Hsinchu (TW); Pin-Chuan Chen, Hsinchu (TW); Wen-Liang Tseng, Hsinchu (TW)

(73) Assignee: Advanced Optoelectronic Technology, Inc., Hsinchu Hsien (TW)

( * ) Notice: Subject to any disclaimer, the term of this patent is extended or adjusted under 35 U.S.C. 154(b) by 0 days.

(21) Appl. No.: 13/953,902

(22) Filed: Jul. 30, 2013

(65) Prior Publication Data

US 2014/0071675 A1   Mar. 13, 2014

(30) Foreign Application Priority Data

Sep. 13, 2012  (CN) .......................... 2012 1 0337230

(51) Int. Cl.
| | |
|---|---|
| F21V 33/00 | (2006.01) |
| F21V 5/04 | (2006.01) |
| F21V 29/00 | (2006.01) |
| F21K 99/00 | (2010.01) |
| G02B 19/00 | (2006.01) |
| F21V 3/02 | (2006.01) |
| F21Y 101/02 | (2006.01) |
| F21Y 113/00 | (2006.01) |

(52) U.S. Cl.
CPC . *F21V 5/04* (2013.01); *F21V 29/22* (2013.01); *F21K 9/135* (2013.01); *F21K 9/50* (2013.01); *G02B 19/0071* (2013.01); *G02B 19/0061* (2013.01); *F21V 29/2231* (2013.01); *F21V 29/246* (2013.01); *F21V 3/02* (2013.01); *F21Y 2101/02* (2013.01); *F21Y 2113/005* (2013.01)
USPC ......................................................... 362/240

(58) Field of Classification Search
USPC .............. 362/240, 308, 311.02; 313/116, 110
See application file for complete search history.

(56) References Cited

U.S. PATENT DOCUMENTS

| | | |
|---|---|---|
| 2010/0270907 A1 | 10/2010 | Yamaguchi et al. |
| 2011/0170299 A1 | 7/2011 | Takase et al. |
| 2011/0305026 A1 | 12/2011 | Mochizuki |

FOREIGN PATENT DOCUMENTS

| | | |
|---|---|---|
| CN | 201836770 U | 5/2011 |
| CN | 102252267 A | 11/2011 |
| JP | 3159653 B2 | 4/2001 |
| JP | 2007048883 A | 2/2007 |
| JP | 2011091022 A | 5/2011 |
| JP | 2011142060 A | 7/2011 |
| JP | 2012003845 A | 1/2012 |
| JP | 2012038449 A | 2/2012 |
| TW | M404326 U1 | 5/2011 |
| TW | M409372 U1 | 8/2011 |

*Primary Examiner* — Joseph L Williams
(74) *Attorney, Agent, or Firm* — Novak Druce Connolly Bove + Quigg LLP

(57) ABSTRACT

An LED bulb includes a connecting member having an Edison male screw base and an LED module engaging with the connecting member. The LED module includes a circuit board, a first LED and a plurality of second LEDs mounted on the circuit board. The first LED is arranged on a center of the circuit board. The second LEDs are located surround the first LED. The LED bulb furthermore includes a plurality of lens. Each lens covers a corresponding second LED. Each lens includes a light-guiding portion which includes a light input surface and a light output surface. Light emitted from each of the second LEDs travels into the lens via the light input surface, and is refracted out to lateral directions of the LED bulb by the light output surface of the light-guiding portion to obtain a wider illumination range.

20 Claims, 5 Drawing Sheets

LED LAMP HAVING A LARGE ILLUMINATION ANGLE

BACKGROUND

1. Technical Field

The disclosure relates to a light emitting diode (LED) lamp, and particularly to an LED bulb having a wider range of illumination.

2. Description of Related Art

LEDs have many beneficial characteristics, including low electrical power consumption, low heat generation, long lifetime, small volume, good impact resistance, fast response and excellent stability. These characteristics have enabled LEDs to be widely used as a light source in electrical appliances and electronic devices.

A conventional LED generally generates a smooth round light field with a radiation angle of 120 degrees (i.e. ±60 degrees). The light emitted from the LED is mainly concentrated at a center thereof. The light at a periphery of the LED is relatively poor in intensity and typically cannot be used to illuminate. Therefore the LED cannot be used in a lamp which requires a wide illumination range, for example, an explosion-proof lamp which may be fitted to a miner's safety helmet, or a gas station canopy lamp.

Therefore, what is needed, is an LED lamp which can overcome the limitations described above.

DETAILED DESCRIPTION

An embodiment of an LED lamp of the present disclosure will now be described in detail below and with reference to the drawings.

Figure 1:
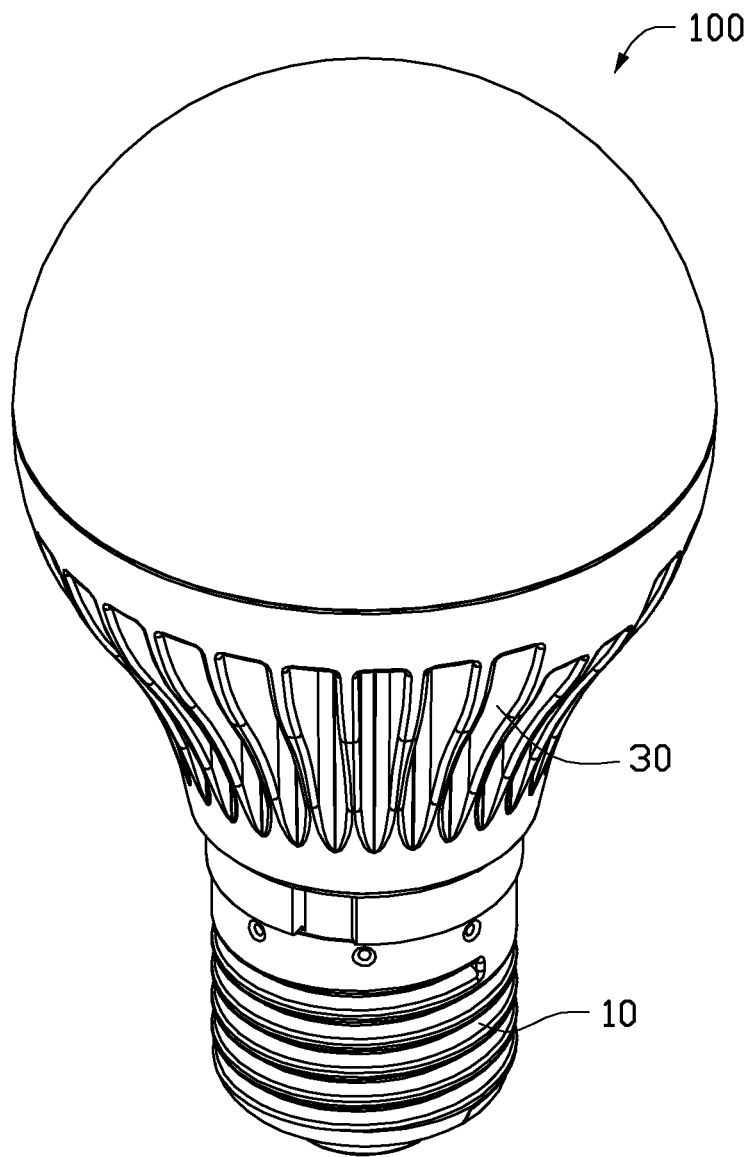
FIG. 1 is an assembled view of an LED lamp according to an embodiment of the present disclosure.

Referring to FIG. 1, an LED lamp 100, in accordance with an exemplary embodiment, is provided. The LED lamp 100 is an LED bulb and includes a connecting member 10 for electrically connecting a power source (not shown) and an LED module 30 engaging with the connecting member 10.

Figure 2:
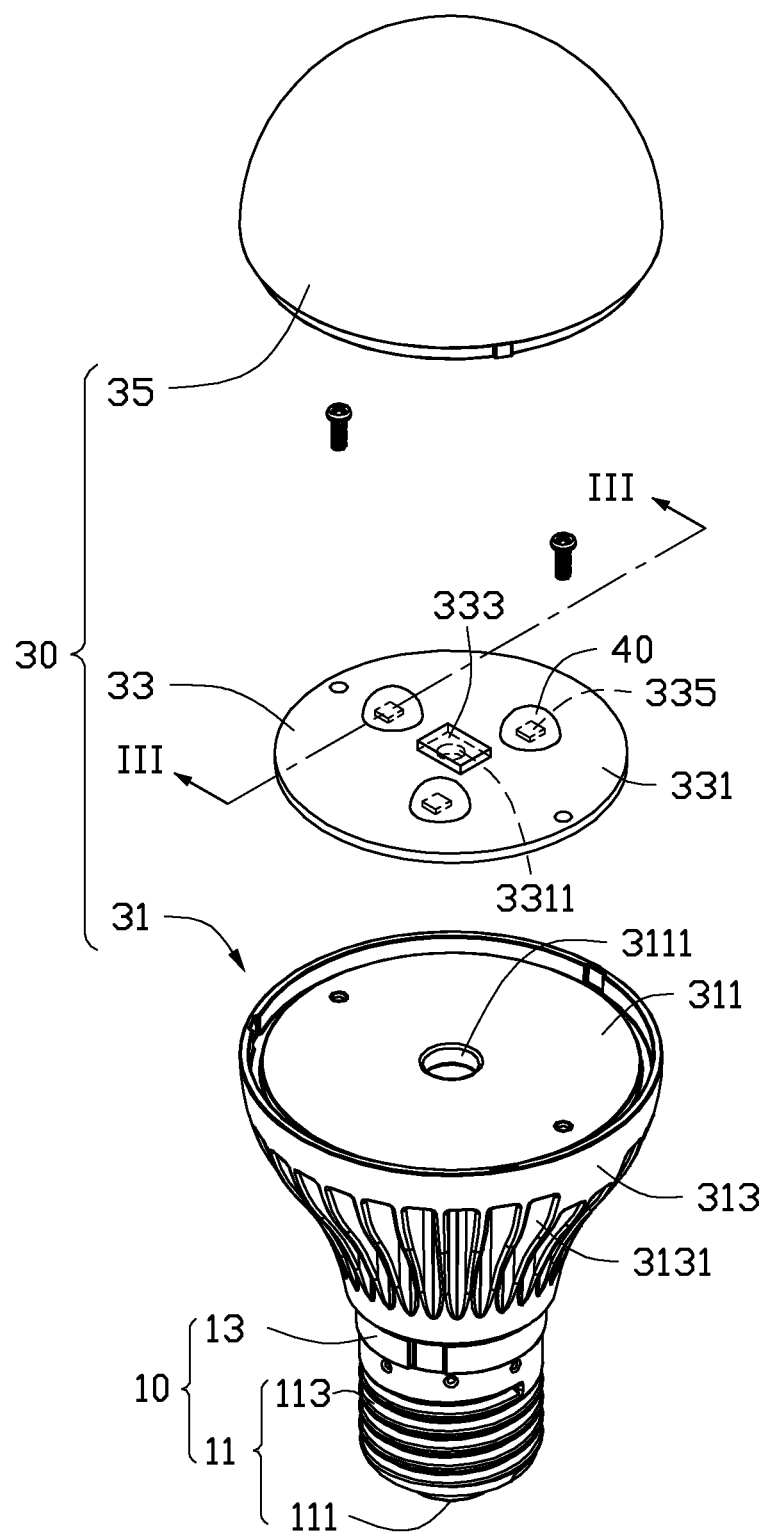
FIG. 2 is an exploded view of the LED lamp of FIG. 1.

Also referring to FIG. 2, the connecting member 10 includes a holder 11 which in the shown embodiment is an E27 Edison male screw base, and a connector 13 engaging with a top end of the holder 11. The holder 11 is configured for screwing to a socket (not shown) to electrically connects the power source. The LED module 30 includes a supporting member 31 engaging with a top end of the connector 13, an LED unit 33 received in the supporting member 31, and an envelope 35 mounted on the supporting member 31 and covering the LED unit 33.

The holder 11 is a hollow tube with the bottom end thereof being closed. A metallic patch 111 is formed on an outside of the bottom end of the holder 11. The metallic patch 111 functions as a positive electrode and a threaded periphery 113 of the holder 11 functions as a negative electrode to electrically connect the power source to drive the LED unit 33 to lighten. The holder 11 is a standard element, so the LED lamp 100 can be directly connect to a standard socket matching with the standard holder 11 to electrically connect with the power source. Thus, the LED lamp 100 of the present disclosure can replace the traditional incandescent bulb and compact fluorescent bulb.

The supporting member 31 is made of aluminum, copper or alloy thereof. The supporting member 31 includes a circular supporting plate 311 and a hollow, cone-shaped heat dissipating portion 313 extending downwardly from an outer periphery of the supporting plate 311. A central portion of the supporting plate 311 defines a first through hole 3111 therein to allow wires (not shown) extending therethrough to electrically connect the holder 11 and the LED unit 31. An outer diameter of the heat dissipating portion 313 axially decreases from a top end engaging with the LED unit 33 to a bottom end connecting the connector 13. A plurality of fins 3131 radially extend from an outer circumferential surface of the heat dissipating portion 313 to dissipate heat of the heat dissipating portion 313 absorbed from the LED unit 31.

The LED unit 33 includes a circuit board 331, a first LED chip 333 and a plurality of second LED chips 335 arranged on the circuit board 331, and a plurality of lenses 40 arranged on the circuit board 331 and covering the second LED chips 335 respectively.

The circuit board 331 is disc-shaped, and is mounted on a top surface of the supporting plate 311. A size of the circuit board 331 substantially equals a size of the supporting plate 311. The circuit board 331 thermally contacts with the supporting plate 311. A second through hole 3311 is defined in a central portion of the circuit board 331. The second through hole 3311 of the circuit board 331 is aligned with the first through hole 3111 of the supporting plate 311. The second through hole 3311 of the circuit board 331 allows the wires to extend there through to electrically connect the LED unit 33.

The first LED chip 333 is located at a center of the circuit board 331, and is surrounded by the second LED chips 335. In this embodiment, the LED lamp 100 includes one first LED chip 333 and three second LED chips 335. The first LED chip 333 is aligned with the second through hole 3311 of the circuit board 331. The three second LED chips 335 are located surrounding the first LED chip 333, and are equidistantly spaced from each other. Each second LED chip 335 spaces a same distance with the first LED chip 333. In this embodiment, the three second LED chips 335 are located on three vertices of an equilateral triangle respectively, and the first LED chip 333 is located at the center of the equilateral triangle. The first and second LED chips 333, 335 can emit light with different colors if needed, and a brightness of each LED chip 333, 335 can be adjusted by the circuit design of the circuit board 331. In this embodiment, there is no lens covering the first LED chip 333.

Figure 3:
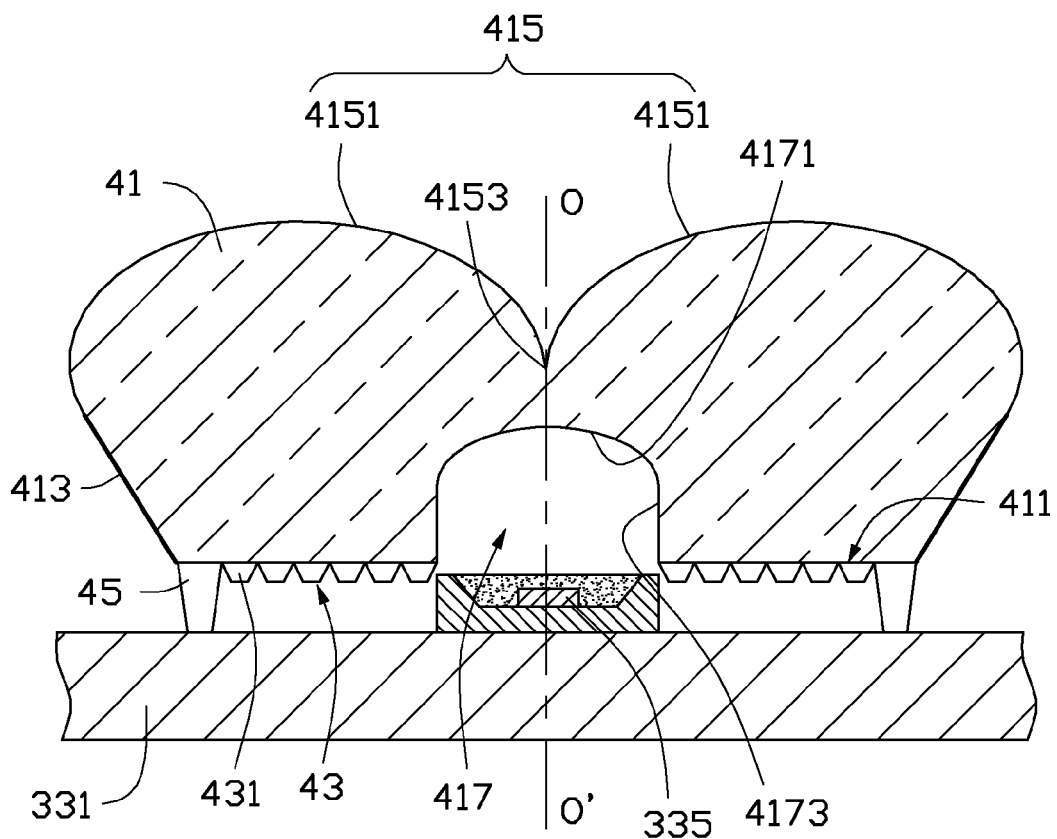
FIG. 3 is an enlarged, cross-sectional view of an LED unit of the LED lamp of FIG. 2, taken along line III-III thereof.
Figure 4:
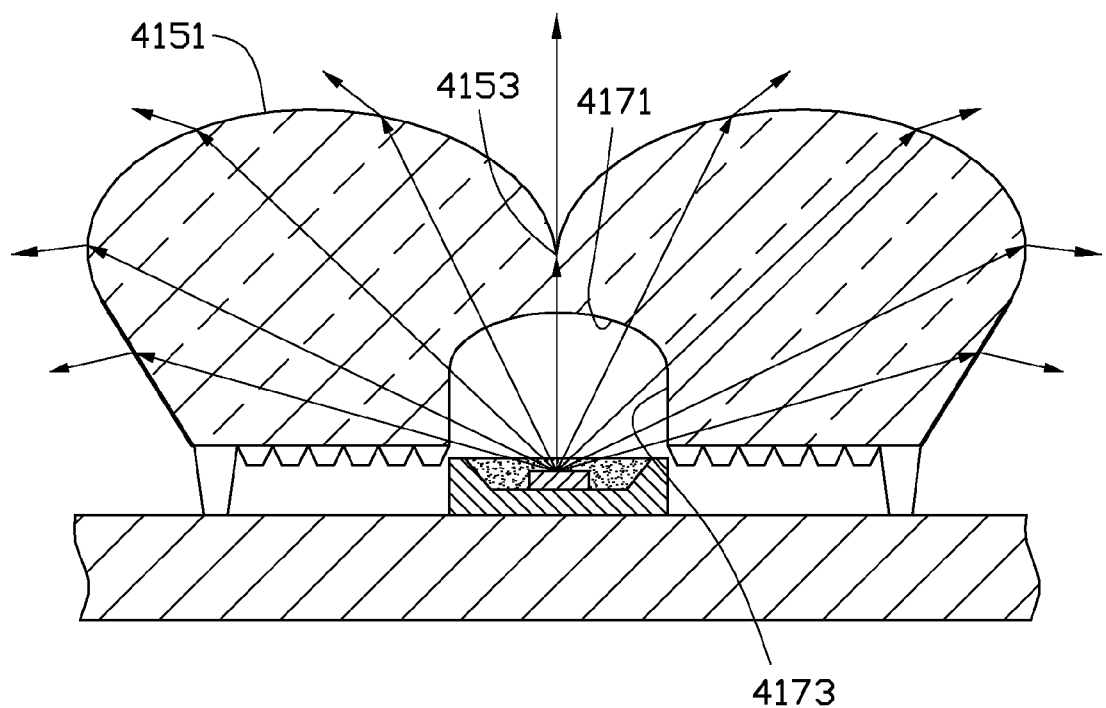
FIG. 4 is a view similar to FIG. 3 with light paths showing light emitted from an LED chip of the LED unit.

Also referring to FIGS. 3-4, each lens 40 is located on the top surface of the circuit board 331, and covers one second LED chip 335 therein. The lens 40 is made of a transparent material with a good optical performance, such as PMMA (polymethyl methacrylate) or PC (polycarbonate). The lens 40 is symmetrical with respect to a central axis O-O' line.

The lens 40 includes a light-guiding portion 41, a rough portion 43 and a pair of retaining portions 45.

The light-guiding portion 41 includes a curved top surface 415, a flat bottom surface 411 and an annular side surface 413 interconnecting edges of the top surface 415 and the bottom surface 411. A width of the top surface 415 along a direction parallel to the top surface of the circuit board 331 is larger than that of the bottom surface 411. The side surface 413 is inclined, and extends downwardly and inwardly from an edge of the top surface 415 to a corresponding edge of the bottom surface 411. The top surface 415 is employed as a light outputting surface of the corresponding second LED chip 335. Most of the light emitted from the second LED chip 335 penetrates the lens 40 from the top surface 415, and another part of the light penetrates the lens 40 from the side surface 413.

The top surface 415 includes a pair of first curved surfaces 4151 cooperatively forming a wing-shaped configuration. The first curved surfaces 4151 are symmetrical about the central axis O-O' line. Each of the first curved surfaces 4151 is convex. An outer edge of each first curved surface 4151 connects a top edge of a corresponding side surface 413. Inner edges of the two first curved surfaces 4151 intersect at a joint 4153. The joint 4153 is located on the central axis O-O' line. A distance between each first curved surface 4151 and the bottom surface 411 of the light-guiding portion 41 is decreased from a central portion of the first curved surface 4151 to a periphery of the first curved surface 4151.

A cavity 417 is recessed from a central portion of the bottom surface 411 to be aligned with the second LED chip 335. The cavity 417 is surrounded by a second curved surface 4171 and an annular surface 4173 connecting the second curved surface 4171. The second curved surface 4171 is convex to form a dome. The center of the second curved surface 4171 is aligned with the joint 4153. The annular surface 4173 is perpendicular to the circuit board 331. The second curved surface 4171 and the annular surface 4173 are employed as a light incident surface of the lens 40. A width of the cavity 417 along the direction parallel to the top surface of the circuit board 331 substantially equals that of the second LED chip 335.

The rough portion 43 and the two retaining portions 45 are protruded downwardly from the bottom surface 411. The rough portion 43 includes a plurality of continuous protruding portions 431. The protruding portions 431 are evenly arrayed on the bottom surface 411 and located around the cavity 417. Each protruding portion 431 has the same shape and size. Each protruding portion 431 is inverted trapeziform, and a width of the protruding portion 431 decreases from a top end connecting the bottom surface 411 to a bottom end away from the bottom surface 411. Edges of top ends of adjacent protruding portions 431 connect with each other, and the another parts of the adjacent protruding portions 431 are spaced from each other. The outer edges of the two protruding portions 431 located at outmost sides of the bottom surface 411 connect inner edges of the two retaining portions 45 respectively. In this embodiment, the lens 40 is fixed on the circuit board 331 by the two retaining portions 45.

The envelope 35 is made of a light permeable material with a high refractive-index and has a hollow, hemispherical-shape. The envelope 35 is fixed on the top end of the supporting member 31, and covers the LED units 33 therein. The envelope 35 can adjust the light emitted from the first and second LED chips 333, 335 to a periphery of the envelope 35 divergently. In this embodiment, a center of a hemispherical-shaped surface of the envelope 35 is aligned with the first LED chip 333.

Figure 5:
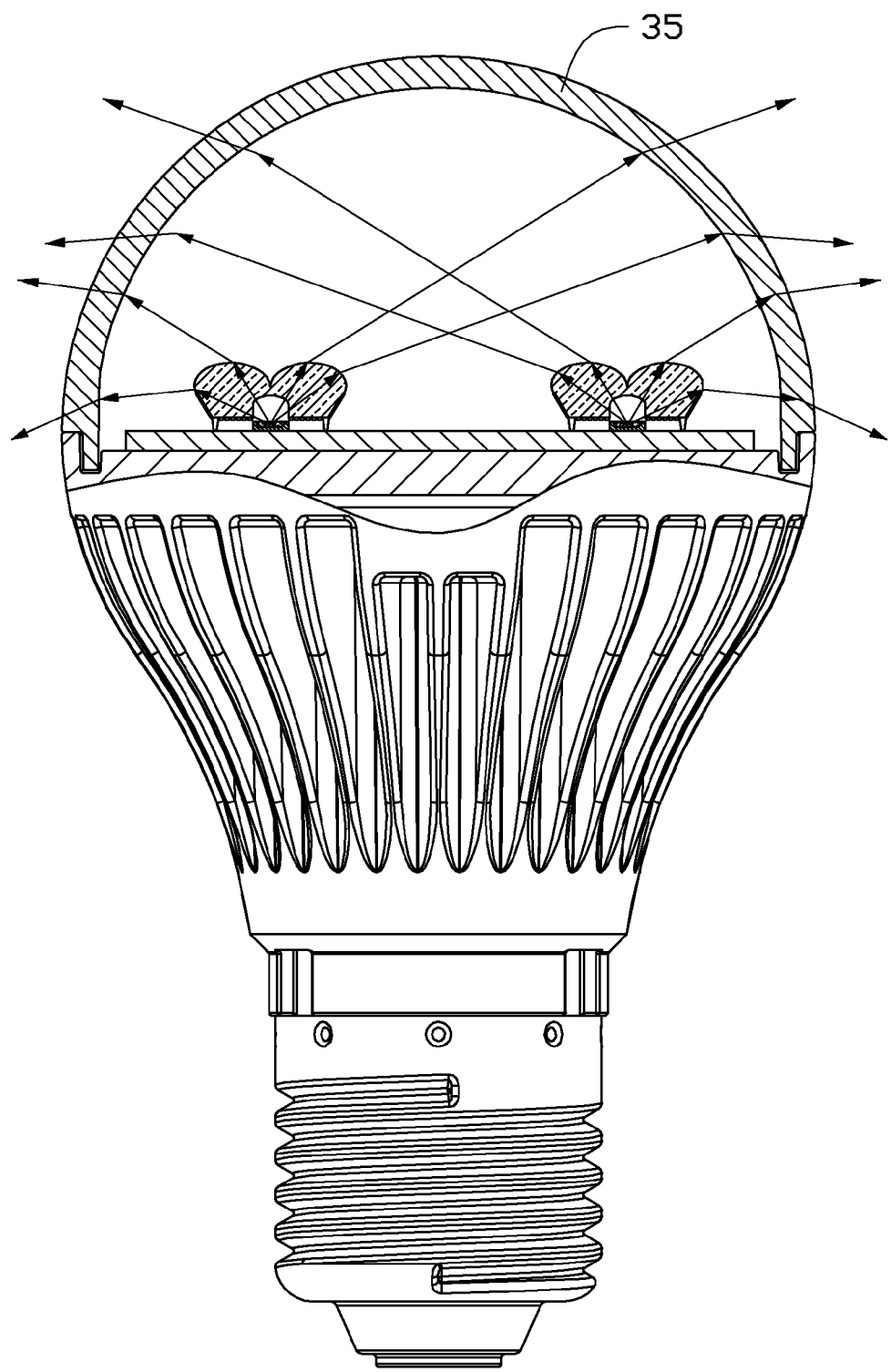
FIG. 5 is a schematic view showing light paths of the LED lamp of FIG. 1.

Referring to FIGS. 4-5, when the LED lamp 100 is operated, light emitted from the first LED chip 333 travels directly into a central portion of the envelop 35 to illuminate with high light intensity. Simultaneously, light emitted from each second LED chip 335 travels into the lens 40 via the inner surface of the cavity 417. For each lens 40, most part of light from a central portion of the second LED chip 335 with high light intensity emits into the top surface 415 of the lens 40, and this part of light is refracted by the top surface 415 to divergently emit into lateral directions of the envelope 35 with a larger light emission angle; another part of the light from a periphery of the second LED chip 335 emits into the annular side surface 413, and this part of light is refracted by the annular side surface 413 to divergently emit into the lateral directions of the envelope 35 as well. And then, the light emitting into the lateral directions of the envelope 35 can be further refracted out by the envelope 35 divergently and uniformly, whereby the LED lamp 100 has a wider range of illumination. In this embodiment, the light emission angle of the LED lamp 100 is larger than 240 degrees.

In addition, because the lens 40 adjusts the light of the central portion of the second LED chip 335 to lateral directions of the second LED chip 335, a light emission angle of each second LED chip 335 is enlarged, such that the number of the second LED chip 335 can be decreased compared to a conventional LED lamp with a wide range of illumination, whereby the manufacturing cost of the LED lamp 100 is reduced.

Further, because the light emission angle of the second LED chips 335 is enlarged by the lenses 40, a distance between the second LED chips 335 can be arranged larger. When the distance between adjacent second LED chips 335 is increased, an overlapping area of the light from the second LED chips 335 will be decreased, and the total light intensity from the second LED chips 335 is decreased accordingly. However, because the first LED chip 333 is located in a center of the second LED chips 335 and the first LED chip 333 has no lens covering thereon, light emitted from the first LED chip 333 is concentrated on the central area of the LED lamp 100 to increase the total light intensity of the LED lamp 100, whereby, a light emission angle of the LED lamp 100 is larger, while the light emitted out from the LED lamp 100 has sufficient intensity.

It is to be understood that the above-described embodiment is intended to illustrate rather than limit the disclosure. Variations may be made to the embodiments without departing from the spirit of the disclosure as claimed. The above-described embodiment illustrates the scope of the disclosure but do not restrict the scope of the disclosure.

What is claimed is:

1. A light emitting diode (LED) lamp comprising:
a connecting member adapted for electrically connecting with a power source; and
an LED module engaging with the connecting member, the LED module comprising a circuit board, a first LED chip mounted on the circuit board, a plurality of second LED chips mounted on the circuit board and surrounding the first LED chip, and a plurality of lenses covering the second LED chips respectively, the first LED chip being located in a center of the area surrounded by the second LED chips, light emitted from the second LED chips being adjusted by the lens to lateral directions of the LED lamp to obtain a wider illumination range, there being no lens covering the first LED chip.

2. The LED lamp of claim 1, wherein the second LED chips are spaced from each other, and each second LED chip spaces a same distance with the first LED chip.

3. The LED lamp of claim 1, wherein the number of the second LED chips is three.

4. The LED lamp of claim 3, wherein the second LED chips are located at three vertices of an equilateral triangle respectively, and the first LED chip is located at a center of the equilateral triangle.

5. The LED lamp of claim 1, wherein light emitted from the first LED chip is concentrated on a central portion of the LED lamp.

6. The LED lamp of claim 1, wherein each of the lenses comprises a light-guiding portion, the light-guiding portion comprises a light incident surface and a light output surface, light emitted from a corresponding second LED chips travels into the lens via the light incident surface, and is refracted by the output surface to lateral directions of the LED lamp.

7. The LED lamp of claim 6, wherein the light output surface comprises a pair of first curved surfaces connecting with each other, and each first curved surface is convex.

8. The LED lamp of claim 7, wherein inner edges of the pair of first curved surfaces intersect at a joint and the pair of the first curved surfaces cooperatively forms a wing-shaped configuration.

9. The LED lamp of claim 8, wherein the light-guiding portion further comprises a flat bottom surface under the light output surface.

10. The LED lamp of claim 9, wherein a cavity is recessed from a central portion of the bottom surface toward the light output surface, and an inner surface of the cavity serves as the light incident surface of the corresponding second LED chip.

11. The LED lamp of claim 10, wherein the cavity is aligned with the joint of the pair of first curved surfaces.

12. The LED lamp of claim 9, wherein two retaining portions are protruded downwardly from the bottom surface respectively, and the lens is fixed on the circuit board by the two retaining portions.

13. The LED lamp of claim 1, wherein the LED module comprises an envelope engaging with a top end of the LED module and covering the circuit board, the first and second LED chips.

14. The LED lamp of claim 13, wherein the envelope has a hollow, and hemispherical-shape to refract light emitted from the first and second LED chips out of the envelope.

15. The LED lamp of claim 14, wherein the envelope is made of a light permeable material, and a center of the envelope is aligned with the first LED chip.

16. The LED lamp of claim 1, wherein the LED module comprises a supporting member supporting the circuit board.

17. The LED lamp of claim 16, wherein the supporting member includes a circular supporting plate supporting the circuit board and a hollow, cone-shaped heat dissipating portion extending downwardly from an outer periphery of the supporting plate.

18. The LED lamp of claim 17, wherein an outer diameter of the heat dissipating portion axially decreases from a top end to a bottom end.

19. The LED lamp of claim 18, wherein a plurality of fins radially extend from an outer circumferential surface of the heat dissipating portion.

20. The LED lamp of claim 16, wherein the supporting member is made of aluminum, copper or alloy.

* * * * *